United States Patent [19]
Oosthoek et al.

[11] Patent Number: 4,652,978
[45] Date of Patent: Mar. 24, 1987

[54] METHOD FOR THE MANUFACTURE OF A WOUND ELECTROLYTIC FOIL CAPACITOR

[75] Inventors: Willem H. Oosthoek; Marinus A. Spang, both of Eindhoven, Netherlands

[73] Assignee: U.S. Philips Corporation, New York, N.Y.

[21] Appl. No.: 826,520

[22] Filed: Feb. 5, 1986

[30] Foreign Application Priority Data

Feb. 20, 1985 [NL] Netherlands .......................... 8500473

[51] Int. Cl.$^4$ .............................................. H01G 9/00
[52] U.S. Cl. ........................................ 361/433; 29/570
[58] Field of Search ....................... 361/433, 320, 321; 29/570; 204/33

[56] References Cited

U.S. PATENT DOCUMENTS 3,566,520  3/1971  Namikata et al. ................... 361/433
4,204,919  5/1980  Randall, Jr. et al. ............. 204/33 X

FOREIGN PATENT DOCUMENTS 2257991  6/1973  Fed. Rep. of Germany.

Primary Examiner—L. T. Hix
Assistant Examiner—Douglas S. Lee
Attorney, Agent, or Firm—Norman N. Spain

[57] ABSTRACT

The use of water-glass for sticking the ends of the wound foil of an electrolytic foil capacitor comprising a wound assembly of a formed anode foil, a separator and a cathode foil, impregnated with a liquid electrolyte or with a solid semiconductive metal oxide. Thanks to this type of adhesive, the wound foil will not detach itself in the course of the manufacturing process. Especially in solid electrolytic capacitors, the polymer adhesive used so far were unreliable. As a result of the invention the number of rejects has decreased drastically.

3 Claims, No Drawings

METHOD FOR THE MANUFACTURE OF A WOUND ELECTROLYTIC FOIL CAPACITOR

The invention relates to a method for the manufacture of a wound electrolytic foil capacitor and to the electrolytic capacitor obtained by means of this method.

There are two versions of this type of capacitor, that is, a wet foil capacitor in which the wound foil is impregnated with a liquid electrolyte solution, and a solid foil capacitor in which the wound foil is impregnated with a solid semiconductive compound. This semiconductive compound, in practice pyrolusite $MnO_2$, is applied by impregnating the wound foil with a solution of a salt of the semiconductive compound, in practice manganese nitrate $Mn(NO_3)_2$, and by subsequently heating it at such a high temperature that the $Mn(NO_3)_2$ is converted into $MnO_2$ by pyrolysis. The wound foil comprises an anode foil which is provided with a dielectric oxide layer obtained by forming, a separator foil of non-electrically conductive material and a cathode foil which is generally not formed, which foils are arranged one on top of the other and then wound together. Both the anode foil and the cathode foil are generally made of aluminum.

In the case of a wet foil capacitor, the separator is generally made of paper; the separator of a solid capacitor is—due to the required resistivity to heating up to the pyrolysis temperature—formed by a glassfabric tape.

The wound foil must remain intact in each of the process steps it is submitted to, such as impregnating, if necessary, heating for pyrolysis of the impregnated compound, reforming, mounting in a housing and during use in the capacitor itself.

For this purpose, the wound foil is stuck together at the ends of the constituent foils, as known from DE-OS No. 22 57 991 for wet electrolytic capacitors and from U.S. Pat. No. 3,566,520 for solid electrolytic capacitors. The sticking operation is carried out using various—generally polymeric—types of adhesives. In solid electrolytic capacitors, a type of adhesive is used which better resists high temperatures, the idea behind this being that the adhesive must remain effective until its function is taken over by the semiconductive oxide—pyrolusite-$MnO_2$. The types of adhesive used so far have all kinds of disadvantages. In wet capacitors, they are often not resistant to electrolyte liquids and in solid capacitors they produce carbon residue when they are heated, due to their organic nature, which residue may raise the series resistance or even cause a short-circuit, or they are subject to decomposition involving the loss of their adhesive force before the pyrolusite can take over their function.

In accordance with the invention, the method for the manufacture of a wound electrolytic foil capacitor is characterized in that the ends of the foils are stuck together using a waterglass solution.

The viscosity can be varied by varying the concentration.

Due to the use of waterglass in the manufacture of a solid foil capacitor, the foil will remain intact during the entire manufacturing process and after the heating process preceding the pyrolisis treatment no harmful substances will remain which adversely effect the properties of the capacitor.

Also for wet foil capacitors, the use of waterglass is advantageous because it adheres better to several types of paper.

The term "waterglass" is to be understood to mean herein a solution of sodium silicate or potassium silicate in water, in which the ratio between alkali oxide and silicon dioxide may vary.

It is also advantageous to add organic fillers to the waterglass solution, such as $SiO_2$ or $Al_2O_3$, thus increasing the bonding strength and the viscosity of the solution.

However, the life-cycle of the solution in the storage vessel prior to application—the so called potlife—is shortened substantially by adding some of the fillers.

The solution can be applied to the wound foil, for example, by means of a brush, a stamp, a roller or a proportioning pump located at the end of the tape which comprises both electrode foils and the separator, or by dipping the end of the tape into the solution.

It is to be noted, that types of adhesive of the said composition which are used for joining ceramic portions of electronic parts are known from, for example, Insulation Circuits, October 1981, 113–115. However, securing the end of a wound foil for an electrolytic capacitor has so far not been proposed.

EXAMPLE 1

Wound foils of a solid electrolytic capacitor having a glass-tape separator are stuck together by means of a potassium silicate solution containing a calculated amount of 15.2% of $SiO_2$; the foils are first dried in air for 15 minutes and then in an oven at 100° C. for a few minutes. The foil is reformed in an aqueous solution of 30° C. for 90 min. and dried in an oven at 100° C. for 30 min. The foil is then immersed in a 60% manganese nitrate solution of 50° C., heated in an oven at 500° C. for $\leq 3$ min and reformed. This series of 3 treatments was repeated 3x.

The wound foils thus obtained remained intact. They were tested by boiling the wound foils in 35 ml. of demineralised water per foil for 10 min. and by measuring the conductivity of the aqueous extract. A blank of a nonglued wound foil yielded a conductivity of $0.3 \times 10^{-6}$ Ohm$^{-1}$ and a wound foil roll treated as mentioned above yielded a conductivity of $1.8 \times 10^{-6}$ Ohm$^{-1}$cm$^{-1}$.

For comparison with the aforesaid, two identical foils were stuck together in known manner using a polystyrene solution. After pyrolysis, the outermost winding(s) had worked loose in 20 to 50% of the wound foils. Due to this the wound foils became unnecessarily thick during further treatment. Moreover, the electric resistance became 1.5 to 2 times as high due to the fact that the effective density of the pyrolusite formed in the wound foil was insufficient.

EXAMPLE 2

Wound foils for a wet electrolytic capacitor having paper as a separator, were stuck together using a solution comprising 70 g of potassium silicate solution with a content of 23% by weight of $SiO_2$ and 7 g of aluminum oxide, the total amount of impurities being <200 ppm with a specific surface of $12 \pm 1$ m$^2$/g.

This inorganic adhesive had a potlife of 96 hours; the settled $Al_2O_3$ as dispersed after agitation of the adhesive.

The separator was impregnated with an electrolyte liquid comprising dimethyl formamide and ammonium pentaborate. After application of the adhesive it was dried in air for a short time. Also these wound foils remained intact during the entire manufacturing process.

What is claimed is:

1. In a method for the manufacture of a wound electrolytic foil capacitor forming an arrangement one upon the other of a cathode foil, a formed anode foil and a separator foil of a non-electrically conductive material separating said anode and said cathode foils, winding said arrangement to form a wound assembly of said cathode foil and said formed anode foil separated one from the other by said separator foil, binding together the ends of said foils in said wound assembly by applying an adhesive to the ends of such foils and then heating said assembly, impregnating said wound assembly with an electrolytic liquid capable of being pyrolytically converted to a solid semiconductor oxide and then heating said thus impregnated wound assembly to a temperature at least sufficient to cause pyrolysis of said electrolyte liquid to said solid conductor oxide, the improvement wherein the adhesive is a waterglass solution.

2. A method as claimed in claim 1, characterized in that inorganic fillers are added to the waterglass solution.

3. An wound electrolytic foil capacitor, obtained in accordance with claim 1.

* * * * *